USOO9631334B2

United States Patent
Gordon

(10) Patent No.: US 9,631,334 B2
(45) Date of Patent: Apr. 25, 2017

(54) MOBILE MARINE BARRIER

(75) Inventor: Robert William Lindsay Gordon, Longniddry (GB)

(73) Assignee: Intelligent Organics Limited (GB)

( * ) Notice: Subject to any disclaimer, the term of this patent is extended or adjusted under 35 U.S.C. 154(b) by 0 days.

(21) Appl. No.: 14/130,252

(22) PCT Filed: Jul. 2, 2012

(86) PCT No.: PCT/GB2012/051541
§ 371 (c)(1),
(2), (4) Date: Dec. 30, 2013

(87) PCT Pub. No.: WO2013/005018
PCT Pub. Date: Jan. 10, 2013

(65) Prior Publication Data
US 2014/0147209 A1 May 29, 2014

(30) Foreign Application Priority Data

Jul. 4, 2011 (GB) .................................. 1111334.7

(51) Int. Cl.
| E02B 7/50 | (2006.01) |
| B63B 35/00 | (2006.01) |
| B63H 1/02 | (2006.01) |
| E02B 3/06 | (2006.01) |
| E02B 7/38 | (2006.01) |
| E03B 11/02 | (2006.01) |

(Continued)

(52) U.S. Cl.
CPC ................ *E02B 7/50* (2013.01); *B63B 35/00* (2013.01); *B63H 1/02* (2013.01); *E02B 3/06* (2013.01); *E02B 3/108* (2013.01); *E02B 7/38* (2013.01); *E03B 11/02* (2013.01); *C02F 1/441* (2013.01); *C02F 2103/08* (2013.01); *C02F 2201/008* (2013.01)

(58) Field of Classification Search
CPC .............. E02B 7/50; B63B 35/00; B63H 1/02
USPC ...................................................... 405/21, 30
See application file for complete search history.

(56) References Cited

U.S. PATENT DOCUMENTS 2,928,250 A    3/1960 Smith
3,919,957 A   11/1975 Ray et al.
(Continued)

FOREIGN PATENT DOCUMENTS

| GB | 1340865 | 12/1973 |
| GB | 2463461 | 3/2010 |
| WO | WO 91/14829 | 1/2013 |

OTHER PUBLICATIONS

Office Action, U.S. Appl. No. 12/960,173, Dated May 27, 2014.
(Continued)

*Primary Examiner* — Tara M. Pinnock
(74) *Attorney, Agent, or Firm* — Workman Nydegger

(57) ABSTRACT

A mobile marine barrier (1) comprising a base (2) and a hood (8) located at a distal end thereof is described. The hood (6) comprises a funnel (15) and a distal surface (18) located therein which allows the hood (6) to morph its shape, size and strength so as to give adaptable coastal protection against naturally occurring events. This is achieved by incorporating a telescopic funnel such that the length of the hood (6) and thus the area of its open end can be altered so as to vary the quantity of water directed towards the distal surface (18). The hood (16) may also comprise a mobile face (17) that forms part of variable volume chamber (26) located within the hood (8) which can be filled and emptied with fluids.

36 Claims, 5 Drawing Sheets

(51) Int. Cl.
    *E02B 3/10*    (2006.01)
    *C02F 1/44*    (2006.01)
    *C02F 103/08*  (2006.01)

(56) References Cited

U.S. PATENT DOCUMENTS

| | | |
|---|---|---|
| 3,955,524 A | 5/1976 | Renoux |
| 4,281,615 A | 8/1981 | Wilson et al. |
| 4,364,691 A | 12/1982 | Wirt |
| 5,195,446 A | 3/1993 | Riddell |
| 6,609,473 B1 | 8/2003 | Cavanagh |
| 6,796,379 B1 | 9/2004 | Martin |
| 7,428,939 B1 | 9/2008 | Ducote |
| 2004/0120770 A1 | 6/2004 | Miyazaki |
| 2005/0191128 A1 | 9/2005 | King |
| 2006/0083592 A1 | 4/2006 | Aughton |
| 2007/0217868 A1 | 9/2007 | Beidle |
| 2007/0253784 A1 | 11/2007 | Harrison |
| 2008/0156731 A1 | 7/2008 | Gordon |
| 2008/0240861 A1 | 10/2008 | Phillips |
| 2010/0155499 A1 | 6/2010 | Gradle |
| 2012/0141205 A1 | 6/2012 | Gordon |

OTHER PUBLICATIONS

International Search Report and Written Opinion, PCT/GB2012/051541, Dated Nov. 6, 2012.
Final Office Action, U.S. Appl. No. 12/960,173, Dated Oct. 25, 2013.
Office Action, U.S. Appl. No. 12/960,173, Dated Mar. 1, 2013.
Office Action, U.S. Appl. No. 12/960,173, dated Mar. 12, 2015.

MOBILE MARINE BARRIER

The present invention relates to the field of coastal protection. More specifically, the present invention relates to a mobile marine barrier that may be selectively deployed to provide coastal protection from naturally occurring events e.g. tropical storms or tidal surges.

Along any coastline anywhere in the world there exist weaknesses that are susceptible to flooding. These weaknesses are often recognised after the occurrence of a storm surge or a tidal surge either from a tropical storm or a naturally occurring event such as a tsunami.

A discussion of the current understanding of how a storm surge is created and what damage it does can be found at magazine.noaa.gov/stories/mag178.htm. This website also discusses the NOAA's storm surge model, known as SLOSH which provides a means for predicting and accurately modelling incoming surge from active storms. The article also provides a discussion on the current options for migrating a storm surge and the relevant disruption and weakness (economic, ecological, environmental and logistical) one storm surge, or the threat of one, can cause.

The above described weaknesses are often caused by fluctuations of the geological distribution of rocky formations further out towards the sea. A full mapping of the coastal/global seafloors can be found on the National Geophysical Data Center website (see ngdc.noaa.gov/mgg/coastal/coastal.html). Along every continental shelf there are differences of how the distribution of geology plays itself out.

An object of an embodiment of the present invention is to provide a mobile marine barrier for protecting these weak areas of coastline which are susceptible to frequent natural events.

A further object of an embodiment of the invention is to provide a mobile marine barrier that acts as a source of fresh water for the area around which it is deployed. The fresh water source may be employed for domestic, commercial or industrial uses.

A yet further object of an embodiment of the invention is to provide a mobile marine barrier that provides a means for containing liquid pollution so as to avoid spills etc to contaminate coastal areas.

SUMMARY OF INVENTION

According to a first aspect of the present invention there is provided a mobile marine barrier the barrier comprising a base and a hood located at a distal end thereof wherein the hood comprises a telescopic funnel and a distal surface located within the funnel The above arrangement provides the mobile marine barrier within which the funnel is arranged so as to channel fluid towards the distal surface. The combined effects of the funnel and the distal surface therefore provide the barrier with a means for deflecting oncoming natural large movements of water and to deflect the physical wave back outwards on itself. In this way the oncoming waves are redirected back out to sea and away from the marine barrier and thus away from the coastline adjacent to where the barrier is deployed.

Employing a telescopic funnel allows for the length of the hood and thus the area (i.e. height and width) of its open end to be altered, as deemed appropriate, so as to vary the quantity of water directed towards the distal surface.

The hood may comprise a mobile face that forms part of variable volume chamber located within the hood. Movement of the mobile face therefore acts to alter the volume of the chamber.

Optionally the mobile face comprises a flexible material e.g. carbon fibre-reinforced carbon or carbon fibre-reinforced silicon carbide. By making the mobile face from a flexible material allows the shape of this surface to morph in response to the fluid content of the chamber.

The hood may further comprise one or more gills arranged so as to provide a means for fluids to enter or exit from the chamber.

Preferably the fluids enter or exit from the chamber in response to varied position of the mobile face.

The hood preferably comprises a section secured to a bottom surface of the base.

Optionally the hood further comprises one or more wind towers that provide a means for harnessing wind energy for use by the marine barrier.

The wind towers may comprise a conduit within which are located one or more wind turbines. The conduits thus provide a degree of physical protection for the wind turbines so as to avoid potential damage thereof by the surrounding elements.

The mobile marine barrier is preferably adapted for movement within a body of water. The marine barrier may comprise one or more propulsion propeller systems that provide a means for propelling the barrier within the body of water. Preferably the propulsion propeller systems comprise a pair of propulsion propellers located on opposite surfaces of the base. A conduit within the base may provide fluid communication between a pair of propulsion propellers.

The marine barrier may comprise one or more directional propeller systems that provide a means for orientating the barrier within the body of water. Preferably the directional propeller systems comprise a pair of directional propellers located on opposite surfaces of the base. A conduit within the base may provide fluid communication between a pair of directional propellers.

Optionally the mobile marine barrier comprises one or more solar panels. The solar panels provide a means for generating electricity for use by the barrier.

Most preferably the mobile marine harrier further comprises an operations housing located on the base. The operations housing is preferably aerodynamically shaped so as to provide maximum protection from the impact of cross winds, tsunamis or storm surges to those components housed therein.

The operations housing may comprise one or more decks. The one or more decks may comprise a deck selected from the group comprising a spacer deck, a control deck, a working deck and an accommodations deck.

Preferably the operations housing comprises an antenna that provides a means of communication for the marine barrier.

The marine barrier may further comprise one or more anchor pods located on the bottom surface of the base. Preferably the one or more anchor pods comprise an anchor the position of which is controlled by a pulley system The base is preferably provided with an access shaft. The access shaft provides a means for crew to access the internal volume of the marine barrier so as to facilitate maintenance and/or internal transport. The entrance to the access shaft is preferably located on the bottom surface of the base. The access shaft therefore provides subsea access to the marine barrier.

Optionally the marine barrier further comprises a desalination apparatus that provides a means for converting the body of water to a fresh water supply.

Optionally the mobile marine barrier further comprises at least one pollution duck arranged to be in fluid communication with the base. Preferably the at least one pollution duck comprises a half spherical body. Such a design allows the duck to be submerged just beneath the water line so as to reduce the level of drag it exhibits when the barrier is manoeuvred.

Preferably a filter is located between the base and the at least one pollution duck so as to provide a means for filtering liquid pollution from the body of water. Preferably the liquid pollution is directed into the at least one pollution pod.

It is preferable for the marine barrier to further comprise one or more water holding tanks. The water holding tanks provide a means for storing fluid which can increase the stability of the marine barrier. Fluid within the water holding tanks may also me employed to fill the internal chamber of the hood.

According to a second aspect of the present invention there is provided a method of protecting an area of coastline from naturally occurring events the method comprising:

locating one or more mobile marine barriers in accordance with the first aspect of the present invention in the vicinity of the area of coastline to be protected; and
selectively deploying the hood of the mobile marine barrier.

Preferably selective deployment of the hood comprises setting a length of a telescopic funnel.

Preferably the selective deployment of the hood comprises setting a position of a movable face relative to a distal surface within a funnel of the hood.

The selective deployment of the hood may further comprise controlling fluid levels with a chamber of the hood.

The location of the mobile marine barrier may be activated upon receipt of a message regarding an oncoming threat.

The method of protecting an area of coastline may further comprise the deployment of one or more anchors so as to secure the position of the mobile marine barrier.

Embodiments of the second aspect of the invention may comprise features to implement the preferred or optional features of the first aspect of the invention or vice versa.

BRIEF DESCRIPTION OF DRAWINGS

Aspects and advantages of the present invention will become apparent upon reading the following detailed description and upon reference to the following drawings in which.

DETAILED DESCRIPTION

Figure 1:
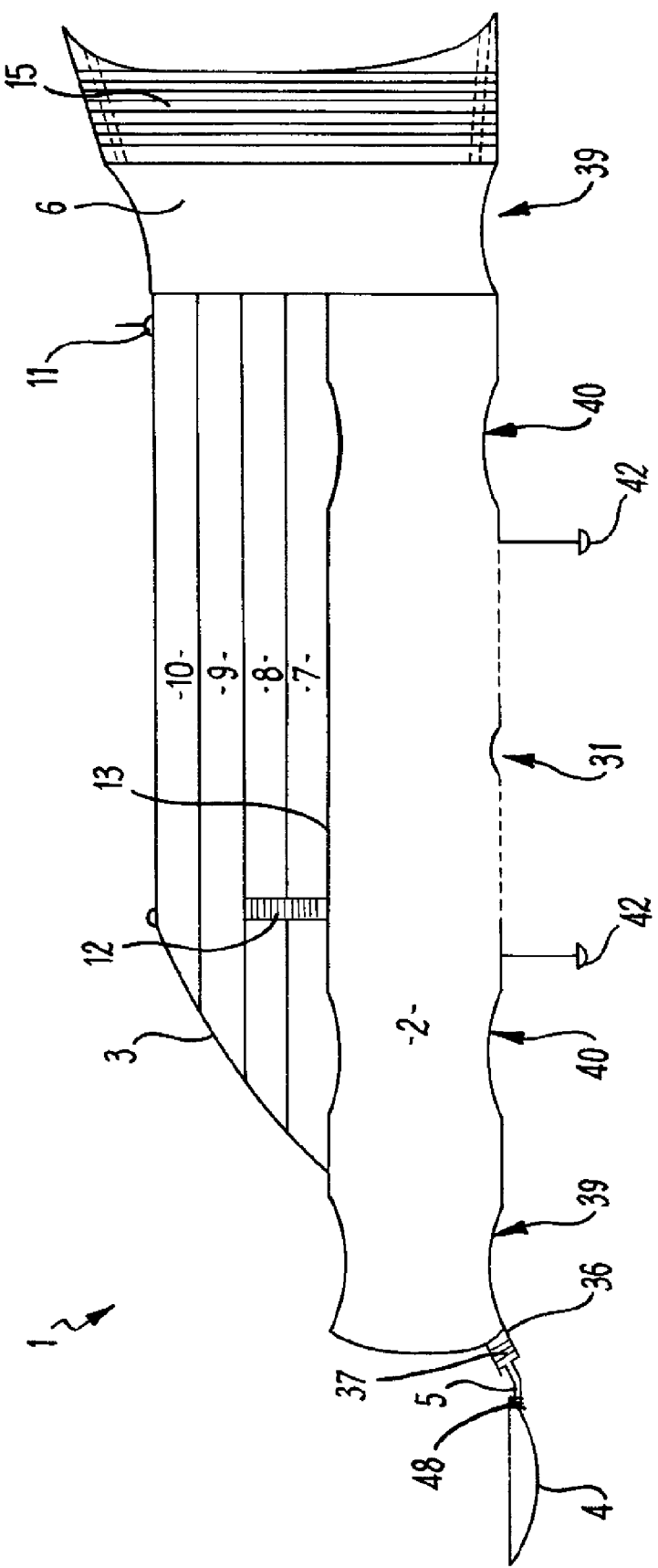
FIG. 1 presents a side view of a mobile marine barrier in accordance with an embodiment of the present invention.

A mobile marine barrier 1 in accordance with an embodiment of the present invention will now be described with reference to FIGS. 1 to 5. In particular, FIGS. 1 to 4 present a side view, a cross-sectional side view, a top view and a bottom view, respectively, of the mobile marine barrier 1 while FIG. 5 presents a cross-sectional top view of a hood section the mobile marine barrier 1.

The mobile marine barrier 1 can be seen to comprise a base 2 upon which is located an operations housing 3. At a proximal end of the base 2 is located a pollution duck 4, which is connected to the base 2 via a flexible pipe 5, while at the distal and of the base 2 is located a hood 6. Further details of all of these features are provided below.

The operations housing 3 is the main structure of the mobile marine barrier 1. It has a smooth outer surface so as to increase its aerodynamic performance and it houses a spacer deck 7, a control deck 8, a working deck 9 and an accommodations deck 10. The control deck 8 is where all the computers and relevant equipment to help the operational crew run the marine barrier 1 is housed. The working deck 9 is next and is employed for the operational crew to work the marine barrier 1. It may be windowed so as to aid visibility for the crew. Preferably the working deck 9 provides access to the upper deck 10 which houses the on board accommodation needs for the crew.

Located on top of the operations housing 3 is a communications antenna 11, that receives all the messages from an early warning system so as to enable the operational crew to activate the mobile marine barrier 1 in time for any action and protection that is required for that area i.e. from an impending tsunami or an oncoming storm surge.

On the outer surface of the operations housing 3 is a ladder 12 which connects the control deck 8, the working deck and 10 to an upper surface 13 of the base 2. The ladder 12 provides an access point for the operational crew, and an emergency exit in times of an unexpected natural event like a tsunami that has not been registered with an associated early warning system.

Solar panels may be located on the outer surface of the marine barrier 1. By way of example solar panels 14 are shown located on the upper surface 13 of the base 2. These solar panels 14 can be employed to supply the power and energy required by various features of the marine barrier 1, as described in further detail below.

The hood can be seen to comprise a funnel 15 that extends from a distal surface 16 i.e. the surface of the marine barrier 1 that is arranged during use so as to be directed towards the oncoming tropical storm or tidal surge. The funnel 15 provides a means for directing or channeling oncoming natural large movements of water towards the distal surface 16. Thus the combined effect of the funnel 15 and the distal surface 16 is to provide the hood 6 with a means for deflecting oncoming natural large movements of water and to deflect the physical wave back outwards on itself. In this way the oncoming waves are redirected back out to sea and away from the marine barrier 1 and ultimately away from the coastline that could be devastated without the protection.

The funnel 15 is preferably telescopic so as to provide a means for its extension or retraction. Employing a telescopic funnel 15 allows for the length of the hood 6 and thus the area (i.e. height and width) of its open end to be altered, as deemed appropriate, so as to vary the quantity of water directed towards the distal surface 16.

Figure 4:
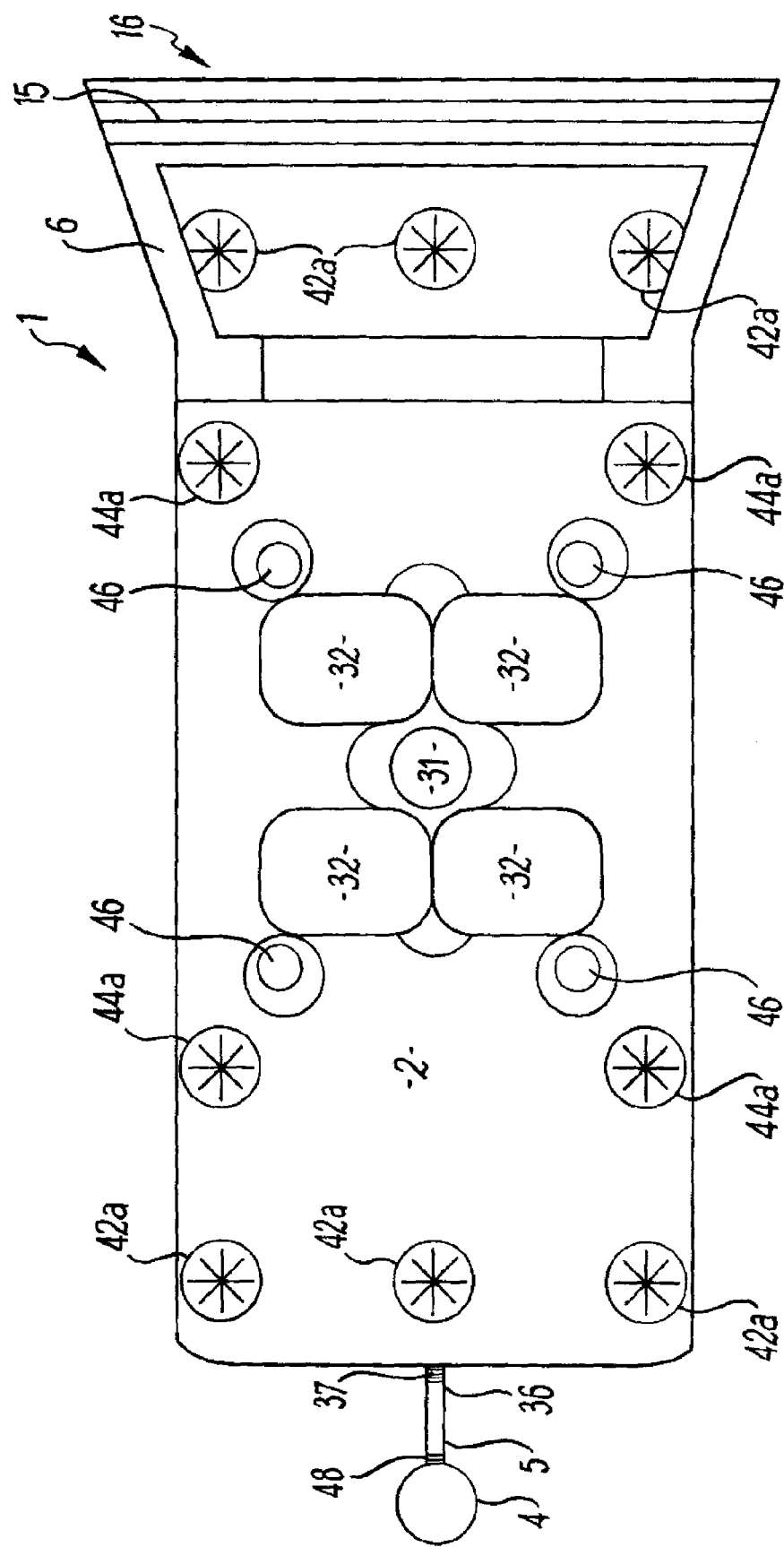
FIG. 4 presents a bottom view of the mobile marine barrier of FIG. 1.
Figure 5:
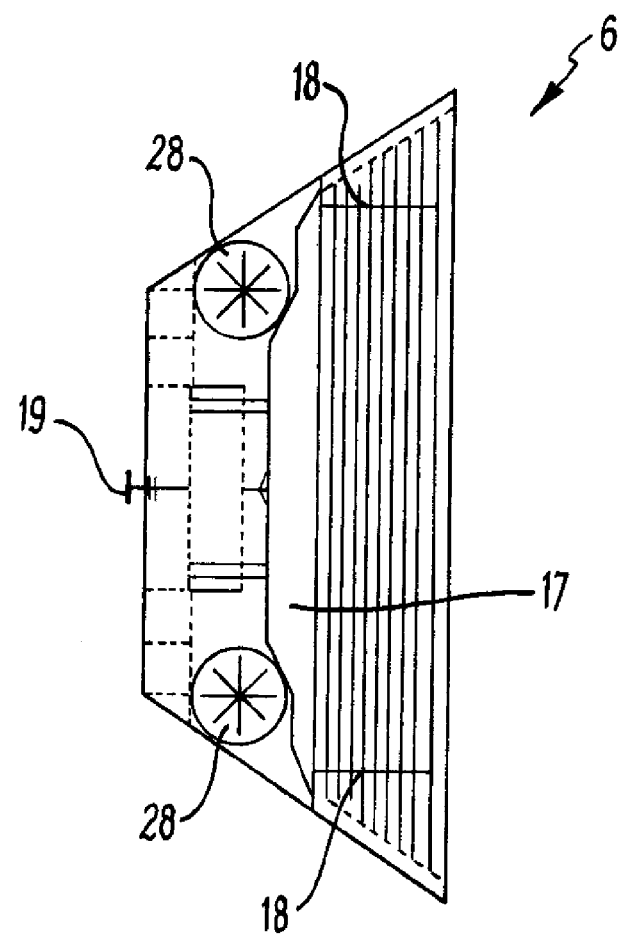
FIG. 5 presents a cross-sectional top view of a hood of the mobile marine barrier of FIG. 1.

As can be seen from FIG. 4 the lower section of the hood 6 is designed to wrap around base 2. The hood 6 thus extends down either side of the front marine barrier 1 to the foot of the base 2 such that it also provides physical protection against damage to the remaining components of the marine barrier 1.

Figure 2:
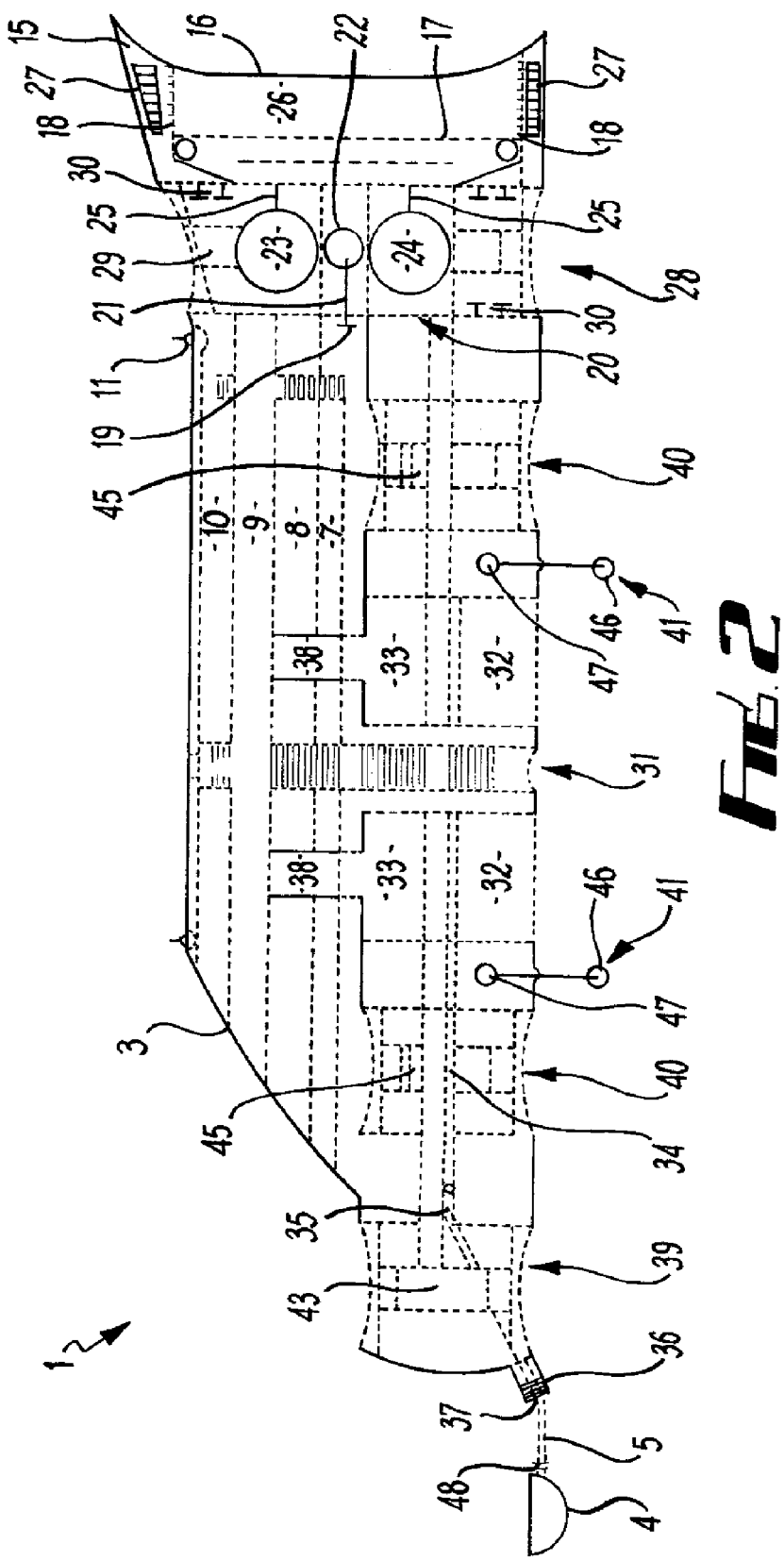
FIG. 2 presents a cross-sectional side view of the mobile marine barrier of FIG. 1.
Figure 3:
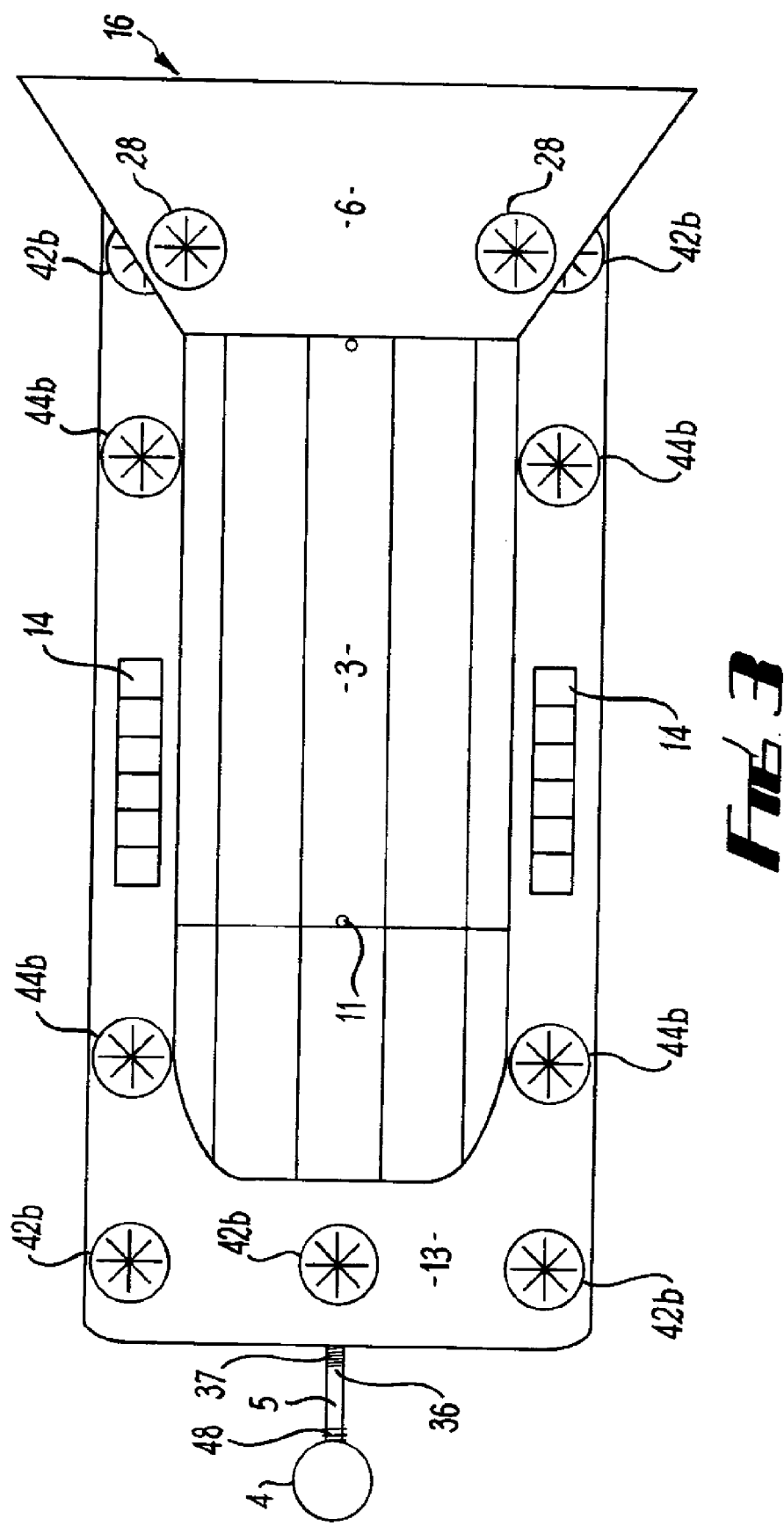
FIG. 3 presents a top view of the of the mobile marine barrier of FIG. 1.

Further details of the internal components of hood 6 can be seen from the cross sectional views of FIGS. 2 and 5. The hood 6 can be seen to comprise a mobile face 17 mounted upon internal runners 18. The position of the mobile face 17 on the runners 18 is controlled by the operation of a wheel 19 which activates a pulley system 20. In particular, the wheel 19 acts to push or pull a control wire 21 which is wrapped around a first cog 22. As the first cog 22 turns, teeth on its outer surface interact with teeth on an outer surface of a second 23 and third cog 24. The second and third cogs 23 and 24 are preferably of equal diameter. Attachment wires 25 wrapped around the second and third cogs 23 and 24 connects the pulley system 20 to the mobile face 17.

As will be appreciated by the skilled reader, a chamber 26 is formed between the mobile face 17 and the internal surface of the distal surface 16. Movement of the mobile face 17 acts to alter the volume of the chamber 26. Gills 27 are located at the top and bottom of the side surfaces of the hood 6 and provide a means for water and air to enter and exit the chamber 26 during the operation of the marine barrier 1. This is achieved as a result of the fact that movement of the mobile face 17 acts to create a level of compression within the chamber 26 when it is pushed or pulled along the runners 18, thus squeezing air and water from, or drawing air and water into, the chamber 26. The mobile face 17 is preferably made from a flexible material so as to allow the shape of this surface to morphed in response to the fluid entering or exiting the chamber 26. Suitable materials for the mobile face 17 include carbon fibre-reinforced carbon or carbon fibre-reinforced silicon carbide. In this way the strength of the marine barrier 1 can be varied as deemed appropriate for the approaching naturally occurring event e.g. tropical storm or tidal surge.

The hood 6 can be seen to further comprise two energy systems 28 which function as wind towers so as to harness natural wind energy for use by the marine barrier 1. The energy systems comprise a conduit 29 that defines an air channel that allows for the free flow of air down through the hood 6 and within which are located a number of wind turbines 30. The wind turbines 30 can therefore be employed to generate electrical energy for use by and/or storage within the marine barrier 1. Advantageously, the conduits 29 provide a degree of physical protection for the wind turbines 30 so as to avoid potential damage thereof by the surrounding elements.

As can be seen from FIG. 4 an access shaft 31 is provided as the primary access point for the operational crew. Access can be achieved via the use of miniature submersible vehicles. This form of transport is preferred because of the harsh working conditions within which the marine barrier 1 will generally be deployed, meaning that it will be both environmentally, ecologically and safe for the operational crew.

FIGS. 2 and 4 also present desalination apparatus that is housed within the base 2 so as to allow for a fresh water supply to be provided to the local area. This is obviously particularly important following the occurrence of a tsunami or a storm surge. The desalination apparatus comprises a plurality of filtering pumps 32 used to pump the sea water through a series of filters, sized accordingly to the requirements, and into water holding tanks 33. The filtering pumps 32 are located where the brine or salinity and marine particle pollution will tend to gather. The water holding tanks 33 are important because they assist with onboard regulation, measuring and monitoring of the amounts of fresh water that will be pumped through from the ocean. This is achieved through monitoring and measurement sensors located along the spacer deck 7 which are controlled by computers located on the control deck 8. Furthermore, providing water within the water holding tanks 33 acts to increase the overall stability of the marine barrier 1. Water from the holding tanks 33 may also be directed so as to fill the internal chamber 26 of the hood 6.

Filtered water from the water holding tanks 33 is then pumped along a water funnel 34. An internal valve 35 within the water funnel 34 provides a means for regulating the amount of water which is pumped from the ocean through the holding tanks 33 and on through the funnel exit 36. The internal valve 35 is preferably a mechanical valve that incorporates a manual override in case of emergency and because of off loading requirements of pollution from the pollution duck 4. The internal valve 35 is controlled remotely via the control deck 8 by the operational crew.

As the water flows exits the water funnel 34 it passes over a molecular protective filter 37. This internal filter can be sized accordingly to the molecular mass, weight and size of fresh water since the molecular structure of fresh water is known to be different from any other water based pollution, including salt. The pumped fresh water can then directed to exit the marine barrier 1 via a hose hook up point (not shown). The remaining portion of the pumped water continues into the flexible pipe 5 and passes and is thus directed towards the pollution duck 4.

It will be appreciated by the skilled reader that the internal chambers may comprise alternative apparatus to the above described desalination apparatus e.g. water turbines or other apparatus suitable for harnessing renewable energy.

Power shafts 38 and the spacer deck 7 provide means for reserved energy or power to travel down through the decks towards the base 2 where the majority of the power is required e.g. to operate the filtering pumps 32. As well as the spacer deck 7 allowing for power to be transferred across the marine barrier 1 it also acts as a protective divider between the decks 8, 9 and 10 and the water held below in the water holding tanks 33.

From FIGS. 1 to 4 the marine barrier 1 can be seen to further comprise a plurality of propulsion propeller systems 39, a plurality of directional propeller systems 40 and a plurality of anchor pods 41. Each of these systems will now be described in further detail.

The propulsion propeller systems 39 are located towards the proximal and distal ends of the base 2. They each comprise a pair of propulsion propellers 42a and 42b located at opposite ends of a propulsion propeller conduit 43 that defines an air channel that allows for the free flow of air down through the base 2. During normal use the propulsion propellers 42a and 42b are designed to have indirect contact with the water. This means the propellers 42a do not disturb the surface of the water directly. They sit above the water surface line and so act to aid the stability of the marine barrier 1. Locating the propulsion propeller systems 39 towards the outer reaches of the base 2 is also found to be advantageous for stability and energy purposes.

A further advantage of the presently described propulsion propeller systems 39 arises from the location of the propulsion propellers 42b on the upper surface of the base 13. Such a design allows the propulsion propeller systems 39 to continue to provide propulsion for the barrier 1 even during periods where the base 2 is partially submerged within the water. The directional propeller systems 40 are employed to maintain directional stability either during operations, or manoeuvring of the marine barrier 1 into position, and are also required for re-adjusting the operational position due to coastal tidal currents and bad weather. Their design is similar to that described above in connection with the propulsion propeller systems 39 in that they each comprise a pair of directional propellers 44a and 42b located at opposite ends of a directional propeller conduit 45 that defines an air channel that allows for the free flow of air down through the base 2. This design allows the directional propeller systems 40 to continue to provide directional control for the barrier 1 even when the base 2 is partially submerged within the water.

It is preferable for both the propulsion propeller systems 39 and the directional propeller systems 40 to also exhibit bidirectional operation. This provides for operational reliability and operational movement for the marine barrier 1.

The anchor pods 41 provide a means for stabilising the marine barrier 1 during active operation. Each anchor pod 41 comprise an anchor 46 that is suspended on an anchor pulley system 47. The anchors 46 can be lowered down by pulley system 47 that is operated by the crew via an access panel in the control deck 8. Once lowered into position the anchors 46 create a collective weight proportional to the area coverage of the base 2 thus providing the marine barrier 1 with operational flexibility without damaging the surrounding environment in the process. When the pulley system 47 is employed to raise the anchors 46 they become fully housed within the base 2 and so do not hinder manoeuvring or positioning of the marine barrier 1.

Further details of the pollution duck 4 located at the proximal side of the marine barrier 1 will now be described. The pollution duck 4 are employed to retain pollutions generated during the above described desalination process. It comprises a half spherical body which is attached to the base 2 via the flexible pipe 5. It is designed to be submerged just beneath the water line so as to reduce the level of drag it exhibits. The pollution duck 4 can be quickly detached in an emergency situation so allowing it to fall towards the sea bed. Preferably, the structure of the pollution duck 4 is resilient against salt and chemical erosion as placement of the pollution duck 4 will typically be within 'hazardous' working environments.

The pollution duck 4 also preferably comprises an access point for the purpose of off loading the liquid pollution. This point may be operated manually from the relevant vessels to carry the alkaline water from the pods to its destination.

At the entrance to the pollution duck 4 may be one or more filters 48. These filters 48 allow for the pollution to pass through enabling accurate readings of how 'clean' or 'fresh' the contained water is. The filters 48 also help in sealing the pollution duck 4 so preventing any sea water from entering the contained pollutions or any pollution to leak into the surrounding sea water.

Within the filters 48 there may be a pressure filter allowing for the accurate reading of air pressure within the pollution duck 4. This is advantageous as it allows the operator to tell if there is a half empty pollution duck 4 or a leak within duck 4 itself. This is especially important during periods of offloading of the pollution into relevant vessels.

Although a single mobile marine barrier 1 has been described in detail above it will be appreciated by the skilled reader that in practice a number of mobile marine barrier 1 can be deployed together so as to extend the length of coastline to be protected.

Operation of a mobile marine barrier 1 is as follows:
1) A message is received via the communication antenna 11 about an oncoming threat such as a storm surge;
2) The mobile marine barrier 1 is then moved into position via the internal driven propellers 39 and 40 which are manually controlled by the operational crew;
3) The operational crew then deploy the hood 6 i.e. by setting the position of both the telescopic funnel 15 and/or the mobile face 17;
4) Preferably the anchor pods 41 are employed so as to secure the position of the marine barrier 1; and
5) When the oncoming energy has passed, the hood 6 and anchors 46 can be retracted and stored away leaving the marine barrier 1 free to manoeuvre to an alternative location.

In summary, the above described mobile marine barrier 1 comprises a hood 6 which can morph its shape, size and strength so as to give adaptable coastal protection against naturally occurring events e.g. tropical storms or tidal surges. This is achieved through by the hood 6 comprising a funnel 15 and a distal surface 16. It is preferable for the funnel 15 to be telescopic such that the overall length of the hood 6 and the area (i.e. height and width) of its open end can be altered.

The distal surface 16 preferably comprises a mobile face 17 which forms part of variable volume chamber 26 located within the hood. Movement of the mobile face 17 acts to alter the volume of the chamber 26 which can be filled or emptied with a fluid, e.g. sea water. The mobile face 17 is preferably made from a flexible material so as to allow the shape of this surface to morph in response to the fluid entering or exiting the chamber 26. In this way the strength of the marine barrier 1 can be varied, as deemed appropriate, for the approaching naturally occurring event e.g. tropical storm or tidal surge.

The marine barrier 1 is also aerodynamically shaped so provide maximum protection against the impact of cross winds and from the impact tsunamis and storm surges.

By incorporating a series of propulsion 39 and directional propellers 40 the marine barrier 1 is adapted for movement within a body of water so as to be able to be positioned in the desired location and orientation to maximise the protection provided to a coastal area. The operational crew can operate this steering mechanism on board the working deck 9. The operational crew can also operate from their vantage point the telescopic funnel 15 and the mobile face 17 so as to deploy the hood 6.

To aid the marine barrier 1 to remain in its original deployed position, anchor pods 41 are provided within the base 2 so as to provide a means for securing the barrier 1 to the seabed.

The mobile marine barrier 1 thus acts as a coastal defense against forever rising sea levels, which in turn also weaken existing defenses. It can also be employed to convert natural energy resources to electricity and/or as a source of fresh water.

A mobile marine barrier comprising a base and a hood located at a distal end thereof is described. The hood comprises a funnel and a distal surface located therein which allows the hood to morph its shape, size and strength so as to give adaptable coastal protection against naturally occurring events. This is achieved by incorporating a telescopic funnel such that the length of the hood and thus the area of its open end can be altered so as to vary the quantity of water directed towards the distal surface. The hood may also comprise a mobile face forms part of variable volume chamber located within the hood which can be filled and emptied with fluids.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. A mobile marine barrier, the barrier comprising a base and a hood located at a distal end of the base, wherein;
the base comprises one or more propulsion systems, the one or more propulsion systems being configured to move and reorient the mobile marine barrier in an open body of water such that the mobile marine barrier can be selectively positioned and reoriented relative to an oncoming water surge; and
the hood comprises a telescopic funnel having an open end and a distal surface located within the telescopic funnel, wherein the open end of the telescopic funnel is disposed further away from the base than the distal surface located within the telescopic funnel, wherein the open end of the telescopic funnel has an outer dimension that defines an area of the open end of the telescopic funnel, wherein the telescopic funnel extends perpendicularly from and retracts perpendicularly towards the distal end of the base to provide a means for altering the outer dimension of the open end of the telescopic funnel and the area defined thereby, wherein the outer dimension of the open end increases as the telescopic funnel extends perpendicularly from the distal end and decreases as the telescopic funnel retracts perpendicularly towards the distal end, so as to be configured to vary the quantity of water that can be received within the telescopic funnel when the mobile marine barrier is disposed within a body of water with the open end of the telescopic funnel directed towards an oncoming water surge.

2. The mobile marine barrier as claimed in claim 1 wherein the hood further comprises a mobile face wherein the mobile face forms part of a variable volume chamber located within the hood.

3. The mobile marine barrier as claimed in claim 2 wherein the mobile face comprises a flexible material.

4. The mobile marine barrier as claimed in claim 2 wherein the hood further comprise one or more gills arranged so as to provide a means for fluids to enter or exit from the chamber.

5. The mobile marine barrier as claimed in claim 4 wherein the fluids enter the chamber in response to the mobile face moving away from the position of the distal surface.

6. The mobile marine barrier as claimed in claim 4 wherein the fluids exit the chamber in response to the mobile face moving towards the position of the distal surface.

7. The mobile marine barrier as claimed in claim 1 wherein the hood comprises a section secured to a bottom surface of the base.

8. The mobile marine barrier as claimed in claim 1 wherein the hood further comprises one or more wind towers that provide a means for harnessing wind energy for use by the marine barrier.

9. The mobile marine barrier as claimed in claim 8 wherein the wind towers comprise a conduit within which are located one or more wind turbines.

10. The mobile marine barrier as claimed in claim 1 wherein the one or more propulsion systems comprise one or more propulsion propeller systems that provide a means for propelling the barrier within the body of water.

11. The mobile marine barrier as claimed in claim 10 wherein the one or more propulsion propeller systems comprise a pair of propulsion propellers located on opposite surfaces of the base.

12. The mobile marine barrier as claimed in claim 11 wherein a conduit within the base provides a means for fluid communication between a pair of propulsion propellers.

13. The mobile marine barrier as claimed in claim 1 wherein the one or more propulsion systems comprise one or more directional propeller systems that provide a means for orientating the barrier within the body of water.

14. The mobile marine barrier as claimed in claim 13 wherein the one or more directional propeller systems comprise a pair of directional propellers located on opposite surfaces of the base.

15. The mobile marine barrier as claimed in claim 14 wherein a conduit within the base provides a means for fluid communication between a pair of directional propellers.

16. The mobile marine barrier as claimed in claim 1 wherein the mobile marine barrier comprises one or more solar panels.

17. The mobile marine barrier as claimed in claim 1 wherein the mobile marine barrier further comprises an operations housing located on the base.

18. The mobile marine barrier as claimed in claim 17 wherein the operations housing comprises one or more decks.

19. The mobile marine barrier as claimed in claim 18 wherein the one or more decks comprise a deck selected from the group comprising a spacer deck, a control deck, a working deck and an accommodations deck.

20. The mobile marine barrier as claimed in claim 17 wherein the operations housing comprises an antenna that provides a means of communication for the marine barrier.

21. The mobile marine barrier as claimed in claim 1 wherein the marine barrier further comprises one or more anchor pods located on the bottom surface of the base.

22. The mobile marine barrier as claimed in claim 21 wherein the one or more anchor pods comprise an anchor the position of which is controlled by a pulley system.

23. The mobile marine barrier as claimed in claim 1 wherein the base is provided with an access shaft.

24. The mobile marine barrier as claimed in claim 23 wherein an entrance to the access shaft is located on the bottom surface of the base.

25. The mobile marine barrier as claimed in claim 1 wherein the marine barrier further comprises a desalination apparatus.

26. The mobile marine barrier as claimed in claim 1 wherein the mobile marine barrier further comprises at least one pollution duck arranged to be in fluid communication with the base.

27. The mobile marine barrier as claimed in claim 26 wherein the at least one pollution duck comprises a half spherical body.

28. The mobile marine barrier as claimed in claim 26 wherein a filter is located between the base and the at least one pollution duck.

29. The mobile marine barrier as claimed in claim 28 wherein the marine barrier further comprise one or more water holding tanks.

30. The mobile marine barrier as claimed in claim 29 wherein the water holding tanks provide a means for filling the internal chamber of the hood with a fluid.

31. A method of protecting an area of coastline from naturally occurring events the method comprising:
   locating one or more mobile marine barriers as claimed in claim 1 in the vicinity of the area of coastline to be protected; and
   selectively deploying the hood of the one or more mobile marine barriers.

32. The method of protecting an area of coastline as claimed in claim 31 wherein the selective deployment of the hood comprises setting a length of a telescopic funnel.

33. The method of protecting an area of coastline as claimed in claim 31 wherein the selective deployment of the hood comprises setting a position of a movable face relative to a distal surface within a funnel of the hood.

34. The method of protecting an area of coastline as claimed in claim 31 wherein the selective deployment of the hood further comprises controlling fluid levels with a chamber of the hood.

35. The method of protecting an area of coastline as claimed in claim 31 wherein the locating of the one or more mobile marine barriers is activated upon receipt of a message regarding an oncoming threat.

36. The method of protecting an area of coastline as claimed in claim 31 wherein the method further comprises the deployment of one or more anchors so as to secure the position of the one or more mobile marine barriers.

* * * * *